United States Patent
Ke

(10) Patent No.: US 9,665,516 B2
(45) Date of Patent: May 30, 2017

(54) COMPUTER AND METHOD TO REALIZE THE COUPLING BETWEEN COMPUTERS

(75) Inventor: Haibin Ke, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 773 days.

(21) Appl. No.: 13/637,963

(22) PCT Filed: Mar. 21, 2011

(86) PCT No.: PCT/CN2011/000465
§ 371 (c)(1),
(2), (4) Date: Nov. 26, 2012

(87) PCT Pub. No.: WO2011/120329
PCT Pub. Date: Oct. 6, 2011

(65) Prior Publication Data
US 2013/0060896 A1    Mar. 7, 2013

(30) Foreign Application Priority Data
Mar. 30, 2010   (CN) .......................... 2010 1 0137052

(51) Int. Cl.
*G06F 15/16*    (2006.01)
*G06F 13/38*    (2006.01)
(Continued)

(52) U.S. Cl.
CPC ............ *G06F 13/385* (2013.01); *G06F 3/023* (2013.01); *G06F 13/4027* (2013.01)

(58) Field of Classification Search
CPC .......... G11C 7/1066; G11C 2207/2227; H04N 1/00079; H04N 1/00891; H04N 9/7921;
(Continued)

(56) References Cited

U.S. PATENT DOCUMENTS

2005/0202844 A1*  9/2005  Jabri .................... A61B 5/7475
                                                              455/556.1
2005/0216620 A1*  9/2005  Sandulescu ............. G06F 3/023
                                                              710/62
(Continued)

FOREIGN PATENT DOCUMENTS

| CN | 1859596 A | 11/2006 |
| CN | 2898938 Y | 5/2007 |
| CN | 101609414 A | 12/2009 |

OTHER PUBLICATIONS

International Search Report of The State Intellectual Property Office, the P.R. China, dated Jun. 20, 2011, in application No. PCT/CN2011/000465, published Oct. 6, 2011 as WO2100120329A1.

*Primary Examiner* — Dustin Nguyen
*Assistant Examiner* — Hao Nguyen
(74) *Attorney, Agent, or Firm* — Kinney & Lange, P.A.

(57) ABSTRACT

The present invention provides a computer and a method to realize the coupling between computers. The computer includes: a first interface used to connect with a second computer; a data interactive module, connected with the second computer through the first interface, which is used to enable the second computer to access the data interactive module when the first interface is connected with the second computer, in which the access includes fetching data from the data interactive module and storing data in the data interactive module; a processing module connected with the data interactive module, which is used to communicate data to the second computer through the data interactive module when the first interface is connected with the second computer. It can conveniently utilize two computers to form a hybrid computer system using this technical solution.

8 Claims, 3 Drawing Sheets

(51) Int. Cl.
*G06F 3/023* (2006.01)
*G06F 13/40* (2006.01)

(58) Field of Classification Search
CPC ............ H04N 21/43615; G06F 1/3287; G06F
3/0634; G06F 17/30171; G06F 1/3215;
G06F 3/023; G06F 13/385; G06F 3/038;
G06F 3/0481; G06F 9/4443; G06F 9/543;
G06F 13/4027; G06F 21/84; G06F 21/85;
H04W 52/0274; A61B 5/7475
USPC ..... 709/205, 217; 715/740; 710/62, 73, 306,
710/316; 455/556.1, 557
See application file for complete search history.

(56) References Cited

U.S. PATENT DOCUMENTS

| | | | |
|---|---|---|---|
| 2007/0055740 A1* | 3/2007 | Luciani | H04L 41/22 709/217 |
| 2008/0284907 A1* | 11/2008 | Chiao | H04N 7/163 348/448 |
| 2009/0210608 A1 | 8/2009 | Chang et al. | |
| 2009/0319909 A1* | 12/2009 | Hsueh et al. | 715/740 |
| 2010/0100652 A1* | 4/2010 | Lin et al. | 710/73 |
| 2010/0262674 A1* | 10/2010 | Tanaka | H04N 21/4325 709/217 |

* cited by examiner

COMPUTER AND METHOD TO REALIZE THE COUPLING BETWEEN COMPUTERS

FIELD OF INVENTION

The present invention relates to a field of computer technique, in particularly to a computer and a method to realize the coupling between the computer systems.

DESCRIPTION OF PRIOR ART

At present, there are various computer applications, which comprise some basic applications requiring lower processing capability and lower power consumption of the computer, such as networking, media play and processing of normal formats documents, and comprise complex applications requiring higher processing capability and higher power consumption of the computer, such as network games and running complex application. The speed of starting up of the computer with a higher processing capability usually is slower than that of the computer with a lower processing capability. Commonly, when the users only needs to process the basic applications such as checking email, they hope the computer can be started up rapidly and consumes lower power. In order to solve such an issue, the prior art propose a hybrid computer including two processing systems, which hybrid computer comprises a first processing system with a lower processing capability and a lower power consumption and a second processing system with a higher processing capability and a higher power consumption. The user may select which processing system will be started up according to their requirements. In the prior art, the hybrid computer is usually implemented as one computer physically and different processing systems are provided in the host of the computer.

During the process of implementing the present invention, the inventors find there are at least the following issues in the prior art:

In such an integrative hybrid computer, the two processing systems are fixedly provided in one computer, which is not flexible and bring inconvenience to the user to use. Furthermore, there is not a method of conveniently constituting a hybrid computer system by two computers in the prior art.

In the present family, there usually are two electronic devices with different processing capabilities, e.g. a desktop computer and a net-book, a desktop computer and a television with a simple processing function, and so on. There is always an issue for the present industry about how to constitute a hybrid computer system by two devices without peer to peer processing capabilities to realize a hybrid architectural functions in one computer.

SUMMARY OF THE INVENTION

The embodiment of the present invention provides a computer and a method to realize the coupling between computers, so as to solve the technical problem of being incapable of conveniently utilizing two computers to constitute a hybrid computer system in the prior art.

The computer according to an embodiment of the present invention comprises a first interface and a data interactive module, which may be connected with a second computer through the first interface. When the computer is connected with the second computer, the second computer is enabled to access the data interactive module and to communicate data to the second computer through the data interactive module. Consequently, the computer according to the embodiment of the present invention may conveniently implement data interaction with the external computer system including any present computers by an ordinary data interface and constitute a hybrid system, without making any change to the hardware of the second computer.

The computer according to the embodiment of the present invention comprises a first input and output device interface connected with an input and output device; a second input and output device interface for receiving an input and output device data input by a second computer; and an input and output device switching module connected with the input and output device, for associating the input and output device with the local computer (e.g. outputting a video signal of the local computer on a video signal output device such as a display) or associating the input and output device with an external second computer (e.g. outputting a video signal input by a second computer on a video signal outputting device) by the processing module controlling the input and output device switching module.

One of the technical solutions mentioned above has the following technical effect: the hybrid computer system according to the embodiment of the present invention may simply implement data synchronization and collaborative work by a commonly used interface and may implement the data synchronization between computers all the better. It may implement a rapid switching of the user scene and have a higher speed of switching the user scene and higher stability. The two computer systems couple through an ordinary data port and implement the communication between the two computers by software, which has a strong coupling.

DETAILED DESCRIPTION OF PREFERRED EMBODIMENTS

The embodiment of the present invention will be illustrated in detail in conjunction with the accompany figures and the following embodiments, by way of which the technical problem to be solved, technical solutions and advantages of the embodiment of the present invention may become more apparent.

Figure 1:
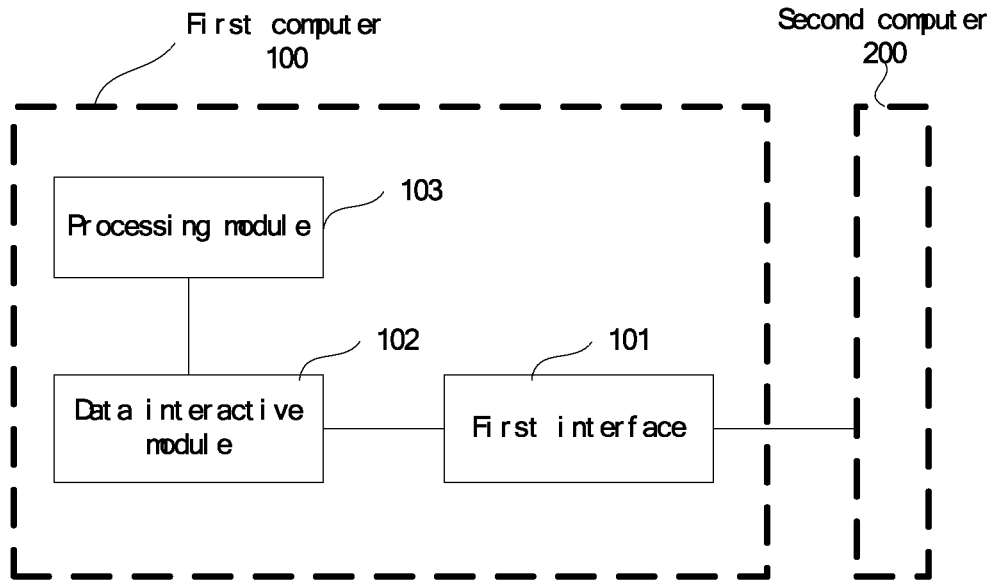
FIG. 1 is a schematic view of the arrangement of a computer according to an embodiment of the present invention.

FIG. 1 is a schematic view of the arrangement of a computer according to an embodiment of the present invention. As shown in FIG. 1, the first computer 100 of an embodiment of the present invention comprises a first interface 101 used to connect with a second computer 200; a data interactive module 102, connected with the second computer through the first interface, which is used to enable the second computer to access the data interactive module when the first interface is connected with the second computer, in which the access includes fetching data from the data interactive module and storing data in the data interactive module; a processing module (a first processing module) 103 connected with the data interactive module, which is used to perform data communicate with the second computer through the data interactive module when the first interface is connected with the second computer.

The first computer and the second computer according to an embodiment of the present invention may utilize an ordinary data interface to conveniently implement data interaction with the external computer system through the first interface and the data interactive module, so that the two computer systems may recognize each other and mutually control each other so as to constitute a hybrid system without making any change to the hardware of the second computer.

In the computer according an embodiment of the present invention, the data interactive module is an intermediate data processing module which may be connected with at least two computers and be accessed by the two connected computers, and may implement data transmission between the two computers, during which one computer may fetch data stored to the data interactive module by the other computer. For example, during data transmission, the computer of an embodiment of the present invention (i.e. the first computer) sends data (the first data) to the data interactive module, and the second computer fetches from the data interactive module the first data sent to the data interactive module by the first computer. In this way, the data between the first and second computers are transparent to each other, which largely decrease the complexity of data transmission between the two computers. Since the interface between the data interactive module and the computer is simplified to design, the complexity of the hardware design and software design are largely decreased.

In the prior art, when the data sharing is implemented through data sharing in a local area network and a network data sharing is implemented through a net meeting, it is necessary to encapsulate data into a package, and then it is transmitted to the destination over a network card and a network. In the data sharing of the prior art, it requires the computers of the both sides have similar hardware and/or software configuration, e.g. both of them need network card. When the computer according to an embodiment of the present invention is used to realize a hybrid system, it only requires one side has a data interactive module and the other side only needs to have an ordinary data interface such as a USB interface. As compared with the solution of the prior art, the computer according to an embodiment of the present invention is capable of constituting a hybrid system with a computer having an ordinary interface such as a USB interface, which has a strong expansibility.

Exemplificative, when the computer according to an embodiment of the present invention is utilized to realize a hybrid system with a second computer, the two computers connected to each other through a first interface realize data communication between the two computers by running a communication program (a first program). The communication program may be preset in the data interactive module and the second computer may fetch and run the communication program by accessing the data interactive module. In this way, the second computer may fetch the first program for communication through the data interactive module. Certainly, the present invention does not limit how the second computer to fetch the communication program. The second computer may fetch the communication program though various other manners, such as network downloading. The first program may be implemented by a plurality of existing communication applications.

Preferably, the processing module mentioned above may be implemented by a central processing unit. Exemplificative, it is implemented by an ARM processor, i.e. an Advanced RISC machine.

Preferably, in the computer according to embodiment of the present invention, the processing module further comprises a data fetching module 104 which is configured to monitor the change of data in the data interactive module when the first interface is connected with the second computer and configured to fetch the second data stored to the data interactive module by the second computer from the data interactive module. Preferably, the date fetching module monitors whether there is the second data sent from the second computer in the data interactive module and fetches the second data when it monitors there is the second data mentioned above. Exemplificative, the data fetching module is configured to monitor in real time or at fixed time whether there is the second data mentioned above in the data interactive module. Preferably, the data fetching module may be implemented by program codes.

In the subsequent descriptions, the computer according to an embodiment of the present invention is referred as the first computer in order to distinguish it from the external second computer.

In the embodiment of the present invention, the second computer running the first program is capable of sending the data to the data interactive module and monitoring the first data stored by the first computer in the data interactive module, and the second computer fetches the first data from the data interactive module when it monitors that there is the first data in the data interactive module. Preferably, the second computer automatically sends the data to the data interactive module and automatically fetches the first data from the data interactive module when it monitors that there is the first data in the data interactive module. Preferably, the second computer sends the data in real time or at fixed time to the data interactive module and monitors at fixed time whether there is the first data in the data interactive module.

Exemplificative, the first computer is enabled to store the first data into the data interactive module and to fetch the data from the data interactive module by running a second (communication) program on the first computer. In this example, the first program and the second program enable data communication between the first computer and the second computer by taking the data interactive module as an agent. Preferably, the first program and the second program are the same program.

The first data and the second data may be user data stored in the corresponding storage modules. The first data and the second data may be specific data having a predefined meaning according to requirements, e.g. "command". In particularly, it may be a control command sent from one computer to another computer, a command for requesting the other computer entering sleep state, or a command for waking up the other computer from a sleep state.

Preferably, the first interface is a USB interface, the data interactive module is a USB data interactive module capable of implementing USB data transmission, and the first computer and the second computer are connected with each other through a USB signal transmission line. The data interactive module is further configured to enable the second computer identify the first computer as a driver letter and the drive letter contains the data interactive module capable of being accessed. Exemplificative, the first computer and the second computer are connected to each other by a USB line through their respective USB interfaces. After the first computer is connected to the second computer, the second computer may identify the data interactive module of the first computer. Exemplificative, the data interactive module may be an OTI-2208 chip, other chips which may act as a USB data bridge, or a data processing module which may implement the following function: it may be connected to the two computers, be accessed by the two connected computers, and implement data transmission between the two computers; when data transmission is implemented, one computer may fetch data stored to the data interactive module by the other computer. After the first computer is connected to the second computer, the second computer identifies the data interactive module of the first computer as a drive letter, and the second computer may access the data interactive module. The first program is provided in the data interactive module and the second computer may fetch the first program by accessing the data interactive module. After the second computer runs the first program, the second computer may fetch the first data which is stored to the data interactive module by the first computer and sends the second data to the data interactive module. Thus, a channel which may perform data interaction for the computer system between the first computer and the second computer is established by utilizing the data interactive module. When the data interaction is implemented, the data of the sending side are stored or sent to the data interactive module in advance, and the receiving side fetches the data from the data interactive module when it monitors that there is a data sent from the sending side in the data interactive module. Thus, the first computer and the second computer are coupled to constitute a hybrid computer system, implement data synchronization between them and operate cooperatively. Consequently, the computer according to an embodiment of the present invention may utilize an ordinary data port such as USB interface to constitute a hybrid computer system with any other existing computers. In the preferred embodiment of the present invention, data transmission between the first computer and the second computer is implemented by the USB interface and the USB transmission line and may get a higher transmission rate, which may implement better data synchronization between the two computers and rapid switching of the user scenes.

Exemplificative, the computer according to an embodiment of the present invention is a computer with lower power consumption and a lower processing capability. For example, its processor may be an ARM processor, so that the volume of the first computer can be made smaller. The second computer is a computer with higher power consumption and higher processing capability, e.g. the existing X86 computer. In one application of the present invention, the first computer may be operated for 24 hours, e.g. sending and receiving email; and when the user needs it, it may synchronize the data in the first computer such as the received and sent emails to the second computer provided by the user at all hours. As compared with an integrative hybrid computer system, the computer according to an embodiment of the present invention may synchronize the data to any external computer and is not limited to some fixed computer systems, which brings convenience to the user. Taking a simple example, when the integrative hybrid computer system is a bulky desktop computer, it is inconvenient for the user to carry about the desktop computer and it is inconvenient to synchronize the data of the lower processing capability system in the hybrid computer system to the portable computer which the user wants to carry about. However, if the computer according to the present invention is employed, it is convenient to synchronize the data of the computer according to the present invention to the portable computer. Furthermore, the currently existing integrative hybrid computer system mostly employs a USB OTG mode to transfer data. Such an OTG mode needs host/slave mode switching by a GPO/i2c means, which is inconvenient and unstable. However, the hybrid solution implemented by employing the computer according to an embodiment of the present invention is stable and rapid without any switching. Since both of the first computer and the second computer are capable of mutually controlling through the data interactive module, there is not a host/slave mode in the first computer and second computer according to the embodiment of the present invention.

Figure 2:
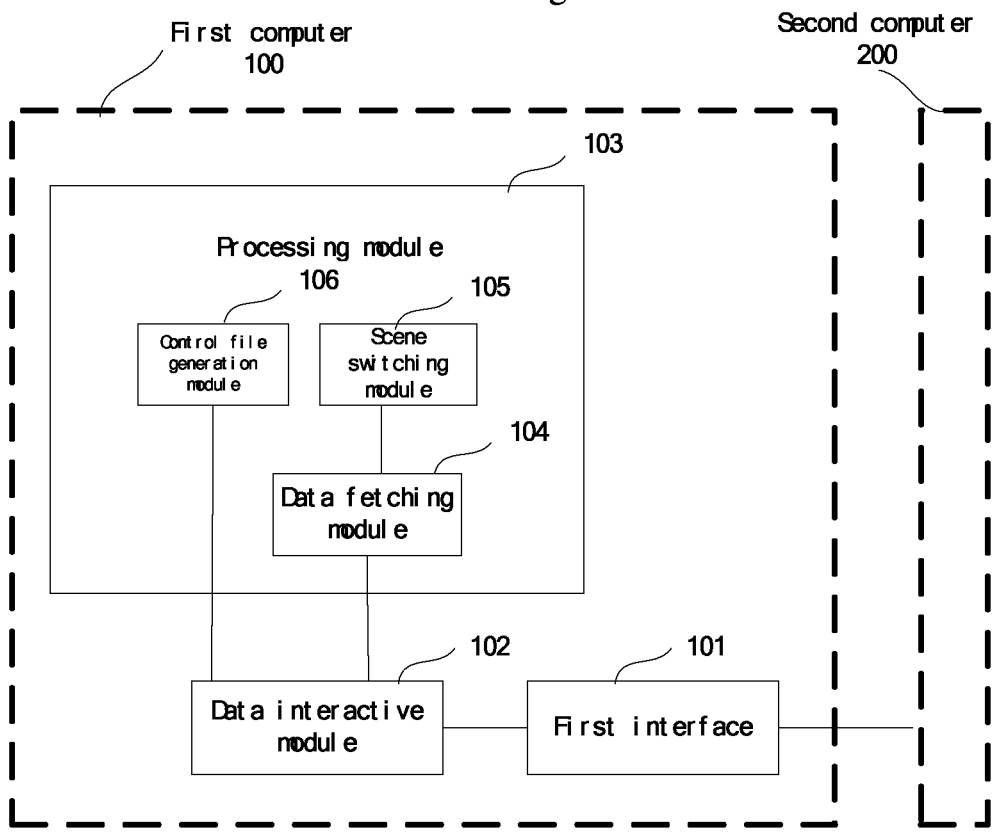
FIG. 2 is a schematic view of the arrangement of a computer according to another embodiment of the present invention.

FIG. 2 is a schematic view of the arrangement of a computer according to another embodiment of the present invention. In this example, the processing module 103 comprises a data fetching module 104 for fetching the second data from the data interactive module 102, the second data including a second control file generated by the second computer 200 according to the collected second user scene information of the second computer. As shown in FIG. 2, in the first computer 100 of this embodiment, the processing module 103 further comprises a scene switching module 105 for switching the current user scene to the second user scene of the second computer according to the second control file. Certainly, in another embodiment of the present invention, the processing module 103 in the first computer 100 further comprises a control file generating module 106 which is configured to collect information of the current first user scene of the first computer, to generate the first control file, to store the first control file into the data interactive module for the second computer to fetch the first control file from the data interactive module and to recover the first user scene in the second computer according to the first control file.

Preferably, in the computer according to an embodiment of the present invention, the processing module may only comprise one of the scene switching module and the control file generating module mentioned above. Thus, the computer may only implement a one way user scene switching.

In the hybrid computer system composed of the first computer and the second computer, the first computer and the second computer may implement switching of the user scenes by employing the scene switching module and the control file generating module mentioned above. Exemplificative, the user scene comprise programs running on the current computer system and opened files on the current computer system, the opened files including file names, location of opening and so on. Exemplificative, when the first computer or the second computer fetches the control file of the opposite side, the control file is analyzed firstly to obtain the user scene information contained in the control file; then the user scene is recovered from the obtained user scene information. Exemplificative, when the user scenes for different computers are switched, if there is not one or more files for the user scene to be recovered in the computer to be switched to, it further comprises transmitting the one or more file which is not present in the opposite side computer to the opposite side computer, in addition to transferring the control file to the computer of the opposite side. Exemplificative, the one or more files which is not present in the opposite side computer may be sent together with the control file to the data interactive module to be fetched by the opposite side computer.

One means of implementing the user scene switching will be exemplified in the following. When the user scene is switched, the collected user scene information is stored to the control file in a predefined format. The predefined format may be synchronously identified by the existing application software in the first and second computers or identified by the first program or the second program. For example, if a document with a file name of ARM.doc is opened in the first computer and the current offset position is the $500^{th}$ line, the first computer records the "file name (ARM.doc)"+"offset position(500)" to the control file when the first computer is switched to the second computer. When the switching succeeds, the control file and the ARM.doc file are together transmitted to the second computer through the data interactive module. After the second computer analyzes the control file, and obtains the information of "file name" (ARM.doc)+"offset position" (500), the corresponding application program (which is a Word program in this embodiment) is run according to the format of the file (which is word format of the Office software by Microsoft) so as to open the file and the cursor jumps to the offset position. Thus, it implements the recovery of the user scene in a certain extent.

Preferably, the second data fetched by the data fetching module of the computer according to an embodiment of the present invention from the data interactive module further comprises a third control file for the second computer controlling the computer including the data interactive module enter a predefined state (a first predefined state); and the processing module further comprises a state switching module for switching the state of the current computer to the predefined state (the first predefined state) according to the third control file. In other words, the second computer further judges the current state of the first computer, and generates a third control file for controlling the first computer enter a predefined state according to the current state of the first computer and such a third control file is included in the second data. When the first computer currently is in a sleep state, the second computer generates a command of waking up (a third control file) and the command of waking up is included in the second data. When the first computer fetches the second data through the data interactive module, it firstly enters the operating status according to the third control file and simultaneously recovers the scene according to the second control file.

Preferably, the first data transmitted to the second computer through the data interactive module by the computer according to an embodiment of the present invention further comprises a fourth control file for controlling the second computer enter a predefined state (the second predefined state); and the second computer further comprises a second state switching module for switching the current state of the computer to the second predefined state according to the fourth control file.

Preferably, the first and second predefined states mentioned above are an operating state or non-operating state. The non-operating state is sleep state, shutting down state and so on.

Preferably, if the first computer is not connected with the second computer, when the first computer monitors that the second computer is connected with itself or the second computer monitors that the first computer is connected with itself, it triggers an action of collecting its own scene. For example, when the embodiment of the present invention is applied, the user currently is watching a movie C on the computer (an ordinary PC) running on a X86 platform in a sanctum and wants to lies himself on the bed in the bedroom to continue watching the movie which is not played completely. At this point, it works as long as the net book in an ARM platform having a data interactive module is connected with the computer running on an X86 platform. When the computer running on a X86 platform monitors the net book in an ARM platform (the data interactive module is located in the net book running on an ARM platform) is connected with the computer, it triggers to collect the current scene information to generate a second control file and enable the net book running on an ARM platform obtain the second control file through the data interactive module. The net book running on an ARM platform may recover the scene of the computer running on a X86 platform according to the second control file, i.e. the movie C is continuing to be played by the net book running on an ARM platform. Certainly, the data interactive module may also be located within the computer running on an X86 platform. Thus, the user can transfer the movie B on an X86 platform to the net book and continue watching it during movement. For example, the movie is watched ad a fixed location in the sanctum (the desktop computer can't be moved) and it is watched by handholding it after moving to the bed in the bedroom (the net book may be moved and is light and handy).

Preferably, when the first computer is connected with the second computer, before the second computer collects the scene information or the second computer collects the scene information, it judges whether it satisfies the predefined conditions; and when it satisfies the predefined condition, it triggers an action of collecting its own scene information. The predefined conditions may be as follows: 1) whether its own performance may support flowing running of the tasks; 2) whether it's own running is the most economic of the power saving under the condition of 1) or when the first computer is separated from the second computer. For example, the first computer is a net-book on an ARM platform and the second computer is a desktop computer or a notebook computer on an X86 platform. When the a large scale network game is run on a net-book on an ARM platform, the net-book on the ARM platform judges that it does not have a capability of supporting the flowing running of the network game. At this point, it triggers an action of collecting its own scene information and generating a first control file. Preferably, it monitors the current operating state of the second computer and generates a fourth control file, and the desktop computer or a notebook on a X86 platform is enabled to obtain the first control file and the fourth control file through the data interactive module. The X 86 platforms enters the operating state according to the first control file and runs and perform the network game according to the fourth control file for supporting the user to use. Certainly, it may be a situation in which the user currently only watches a movie A on a computer of the x86 platform. At this point, the computer of the x86 platform judges that the power consumption when playing the movie in such a task is high and triggers to collect the current user scene to generate a second control file so that the net-book of the ARM platform only performs an operation of watching movie A. certainly, it may be the situation in which the user currently watches a movie B on the computer of an ARM platform, the compute of an x86 platform receives a command of separating from the net-book of the ARM platform, it triggers an action of collecting the current scene information to generate a second control file which enables the net-book of the ARM platform continues performing the action of playing movie B. In this way, the user moves the movie B of the x86 platform to the net-book and may still watch the movie during moving. For example, the movie is watched ad a fixed location in the sanctum (the desktop computer can't be moved) and it is watched by handholding it after moving to the bed in the bedroom (the net book may be moved and is light and handy).

Figure 3:
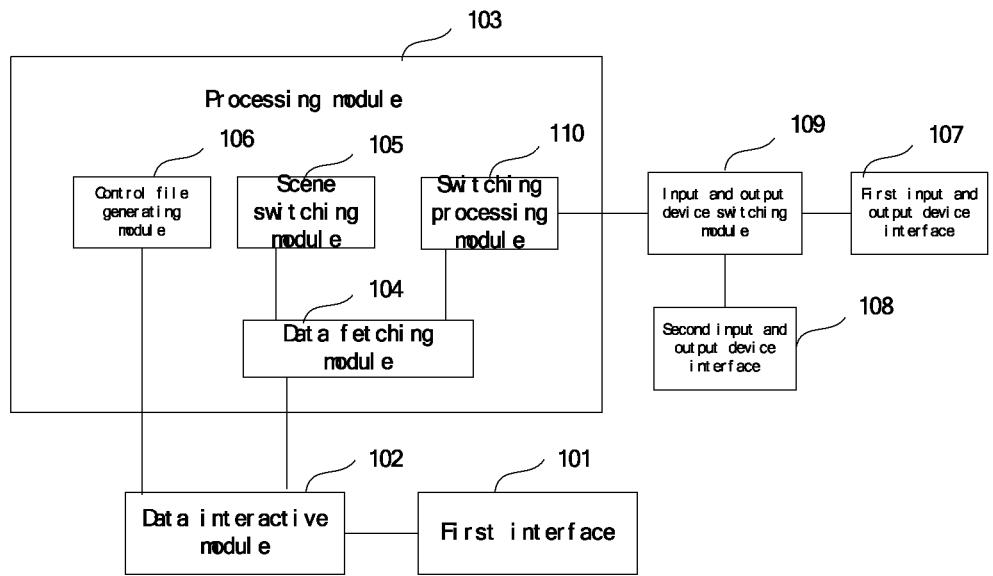
FIG. 3 is a schematic view of the arrangement of a computer according to another embodiment of the present invention.

FIG. 3 is a schematic view of the arrangement of a computer according to another embodiment of the present invention. The computer according to the present embodiment may share a set of input and output device (not shown in the figure) with the external second computer. As shown in FIG. 3, the computer according to the embodiment further comprises:

a first input and output device interface 107 connected with an input and output device;

a second input and output device interface 108 connected with an input and output device interface of the second computer and for receiving an input and output device data input by a second computer;

an input and output device switching module 109 connected with a first input and output device interface and a second input and output device interface;

the processing module further comprises:

a switching processing module 110 further for controlling the input and output device switching module to associate the input and output device with a local first input and output device data or to associate the input and output device with a second input and output device data input by the second computer.

In the computer according the embodiment, the input and output device connected with the first input and output device interface is the local input and output device of the first computer.

Exemplificative, the input and output device switching module is a single pole double throw switch which associates the input and output device with the I first input and output device data of the local computer or with the second input and output device data input by the second computer by controlling the throwing direction of the single pole double throw switch. Exemplificative, the input and output device comprises a video signal displaying device such as a display. When the input and output device is associated with the input and output device data of the local computer, the display outputs video signals of the local computer; and when the input and output device is associated with the input and output device data of the second computer, the display outputs video signals input by the second computer.

Preferably, in the computer according to an embodiment of the present invention, when the input and output device is connected with the local computer, the data fetching module is further configured to fetch the switching file sent to the data interactive module from the second computer, and the switching processing module is further configured to switch the input and output device to be connected with the second computer according to the fetched switching file, so as to associate the input and output device with the input and output device data input by the second computer.

Exemplificative, in one implementation of the computer according to an embodiment of the present invention, the input and output device comprises a display, a keyboard and a mouse. The input and output device according to an embodiment of the present invention comprises two second input and output device interfaces, one of which is a video signal interface and the other of which is a second USB interface. The video signal interface is connected with the video signal output port of the second computer through a video signal line, so that the video signal is transmitted between the first computer and the second computer through a video signal line. For example, the second computer may input its video signals to the first computer. The second USB interface is connected with the USB interface of the second computer through a USB line, so that the keyboard data and mouse data may be transmitted between the first computer and the second computer through the USB line mentioned above. A transmission channel of the input and output device data between the first compute and the second computer is established by utilizing the video signal lines being connected between the video signal interfaces and the USB lines being connected between the USB interfaces, e.g. a transmission channel for data of display, keyboard and mouse, i.e. a transmission channel for KVM (Keyboard, Video or Visual Display Unit, Mouse) data.

Figure 4:
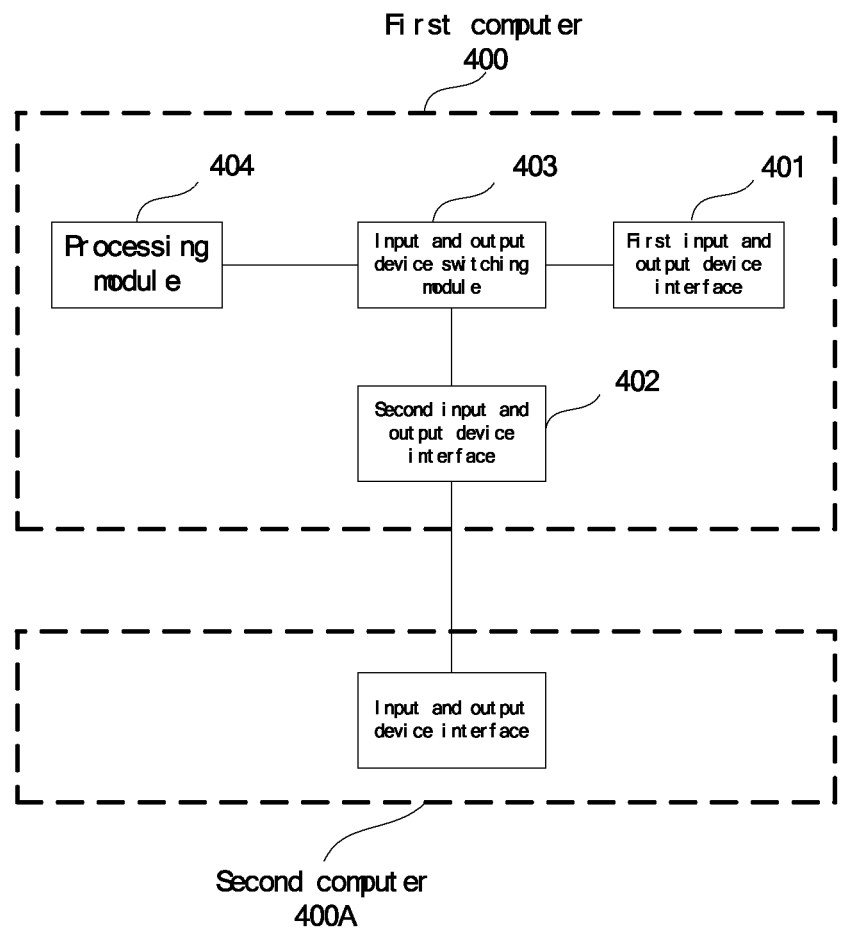
FIG. 4 is a schematic view of the arrangement of a computer according to another embodiment of the present invention.

FIG. 4 is a schematic view of the arrangement of a computer according to another embodiment of the present invention. The computer (the first computer 400) according to the present embodiment may share a set of input and output device (not shown in the figure) with the external second computer. As shown in FIG. 4, the computer according to the embodiment further comprises:

a first input and output device interface 401 connected with an input and output device;

a second input and output device interface 402 connected with an input and output device interface of the second computer and for receiving an input and output device data input by a second computer;

an input and output device switching module 403 connected with a first input and output device interface and a second input and output device interface;

a processing module 404 further for controlling the input and output device switching module to associate the input and output device with a first input and output device data of the local computer or to associate the input and output device with a second input and output device data input by the second computer.

Exemplificative, the processing module may be implemented by a CPU. Exemplificative, the CPU is a processor of ARM series. The processor of the ARM series is connected to the input and output device switching module through GPO. By the computer according to an embodiment of the present invention, it may associate the input and output device with the input and output device data of the local computer and with the input and output device data input by an external second computer. Exemplificative, the input and output device switching module is a KVM switching module. When the computer according to an embodiment of the present invention is connected with a display through the first input and output device interface, it may optionally display the video signal of the local computer or the video signal input by the second computer on a display.

Exemplificative, the input and output device switching module is a single pole double throw switch which associates the input and output device with the first input and output device data of the local computer or with the second input and output device data input by the second computer by controlling the throwing direction of the single pole double throw switch.

Exemplificative, the input and output device comprises at least one of the display, keyboard and mouse.

Exemplificative, in one implementation of the computer according to an embodiment of the present invention, the input and output device comprises a display, a keyboard and a mouse. The input and output device according to an embodiment of the present invention comprises two second input and output device interfaces, one of which is a video signal interface and the other of which is a second USB interface. The video signal interface is connected with the video signal output port of the second computer through a video signal line, so that the video signal is transmitted between the first computer and the second computer through a video signal line. For example, the second computer may input its video signals to the first computer. The second USB interface is connected with the USB interface of the second computer through a USB line, so that the keyboard data and mouse data may be transmitted between the first computer and the second computer through the USB line mentioned above. A transmission channel of the input and output device data between the first computer and the second computer is established by utilizing the video signal lines being connected between the video signal interfaces and the USB lines being connected between the USB interfaces, e.g. a transmission channel for KVM data.

Preferably, the computer according to an embodiment of the present invention further comprises a first interface for connecting with a second computer; a data interactive module connected with the second computer through the first interface and for enabling the second computer access the data interactive module when the first interface is connected with the second computer, the access comprising fetching data from the data interactive module and storing the data to the data interactive module; the processing module connected with the data interactive module and for performing data communication with the second computer through the data interactive module when the first interface is connected with the second computer.

Figure 5:
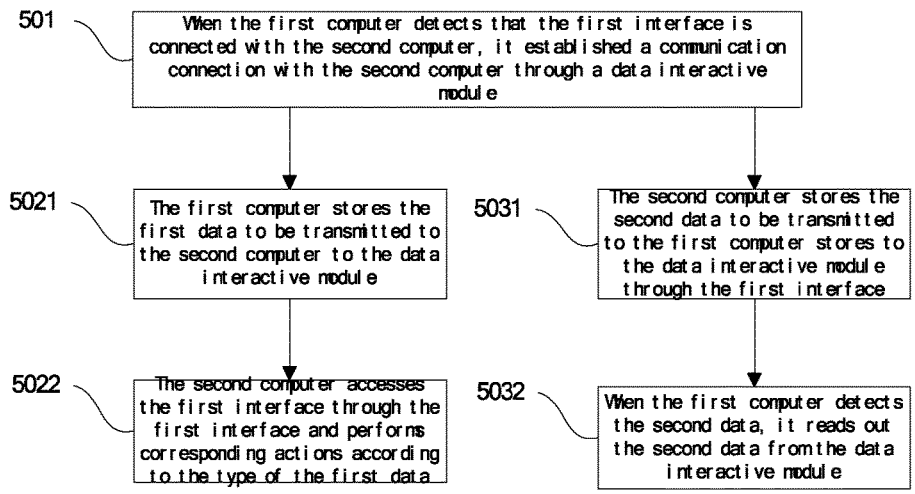
FIG. 5 is a schematic view of the flow chart of the method to realize coupling between computers according to an embodiment of the present invention.

FIG. 5 is a schematic view of the flow chart of the method to realize coupling between computers according to an embodiment of the present invention. The method according to the embodiment is used to realize coupling between the first computer and the second computer, in which the first computer comprises a first interface for connecting with the second computer; a data interactive module connected with the second computer through the first interface and for enabling the second computer access the data interactive module when the first interface is connected with the second computer, the access comprising fetching data from the data interactive module and storing the data to the data interactive module. As shown in FIG. 5, the method comprises the following steps:

a step of 501, when the first computer detects the first interface is connected with the second computer, it establishes a communication connection with the second computer through the data interactive module;

a step of 502, the first computer stores a first data to be sent to the second computer to the data interactive module (5021), in which the second computer accesses the first data through the first interface and performs corresponding actions according to the type of the first data (5022); and a step of 503, the second computer stores a second data to be sent to the first computer to the data interactive module through the interface (5031), and when the first computer detects the second data, it reads out the second data from the data interactive module (5032).

Exemplificative, the first data comprises a control file for switching the user scene, a control file for switching the operation state, a control file for switching the input and output device by the user and so on. The corresponding actions comprise switching the user scene, switching the operation state, switching KVM and so on.

Preferably, the method according to an embodiment of the present invention further comprises that the second computer stores the second data to be sent to the first computer to the data interactive module and the first computer performs corresponding actions according to the type of the second data.

Exemplificative, the first data or the second data comprises a control file for switching the user scene, a control file for switching the operation state, a control file for switching the intput and output device by the user and so on. The corresponding actions comprise switching the user scene, switching the operation state, switching KVM and so on.

Exemplificative, in the step of 501 mentioned above, the first computer places the communication program (the first program) for implementing data communication between two computers in the data interactive module for being accessed by the second computer and being run, thereby implementing mutual identification and mutual control between two computers through a data interactive module. In other embodiment of the present invention, the second computer may fetch the first program in various means, such as by network downloading or by obtaining from other data sources through a data interface.

Preferably, after a communication connection is established between the first computer and the second computer, the method according to an embodiment of the present invention further comprises that:

the second computer stores a second data to be transmitted to the first computer to the data interactive module;

the first computer fetches the second data from the data interactive module when it monitors that there is the second data in the data interactive module.

Preferably, in the method according to an embodiment of the present invention, the first program is provided in the data interactive module, and the step of the first computer transmitting the first program to the second computer through the first interface comprises that:

after the first computer is connected with the second computer through the first interface, the second computer identifies the data interactive module of the first computer;

the second computer fetches the first program from the data interactive module.

Exemplificative, the transmission of the first program may be implemented in other manners, e.g. network line or USB transmission line incorporated an OTI-2208 chip and so on.

Preferably, in the method according to an embodiment of the present invention, the first interface is a USB interface, the data interactive module is a USB data interactive module capable of implementing USB data transmission, and the first computer and the second computer are connected with each other through a USB signal transmission line. The step of the second computer identifying the data interactive module of the first computer is that the second computer identifies the first computer as a driver letter and the drive letter contains he data interactive module capable of being accessed.

Preferably, in the method according to an embodiment of the present invention, the step of the first computer storing the first data to be transmitted to the second computer to the data interactive module comprises that:

the first computer collects information of the current first user scene and generates a first control file;

the first computer stores the first control file to the data interactive module;

after the first control filed is stored to the data interactive module, it further comprises that:

when the second computer monitors the first control file, it fetches the first control file from the data interactive module; and the second computer recovers the first user scene in the second computer according to the first control file.

By employing the method according to an embodiment of the present invention, the first computer may switch the user scene to the second computer and so as to synchronize the user scene of the first computer to the second computer.

Preferably, in the method according to an embodiment of the present invention, the step of the second computer storing the second data to the data interactive module comprises that:

the second computer collects information of the current second user scene and generates a second control file;

the second computer transmits the second control file to the data interactive module;

the step of the first computer fetching the second data from the data interactive module comprises that:

the first computer fetches the second control file from the data interactive module; and the first computer recovers the second user scene in the first computer according to the second control file.

Preferably, in the method according to an embodiment of the present invention, when the first computer or the second computer monitors that it is necessary to switch user scene, the user scene is switched. The common of needing switching may be sent by the user through software or hardware, such as manually through a soft key or hard key, or the computer system automatically switches according the function to be implemented based on the predefined functions of the respective computers.

By employing the method according to an embodiment of the present invention, the second computer may switch the user scene to the first computer and so as to synchronize the user scene of the second computer to the first computer.

Preferably, in the method according to an embodiment of the present invention, the step of the second computer storing the second data to the data interactive module comprises that:

the second computer stores a third control file for controlling the first computer enter a predefined state (a first predefined state) to the data interactive module;

the step of the first computer fetching the second data from the data interactive module comprises that:

the first computer fetches the third control file from the data interactive module and switches the state to the predefined state (the first predefined state) according to the third control file.

Preferably, in the method according to an embodiment of the present invention, the step of the first computer storing the first data to the data interactive module comprises that:

the first computer stores a fourth control file for controlling the second computer enter a predefined state (a second predefined state) to the data interactive module;

the step of the second computer fetching the first data from the data interactive module comprises that:

the second computer fetches the fourth control file from the data interactive module and switches the state to the predefined state (the second predefined state) according to the fourth control file.

Preferably, in the method according to an embodiment of the present invention, the first computer and the second computer share a set of input and output device, and the input and output device is not connected to both of the first computer and the second computer at the same time, e.g. electrically connected;

the first computer comprise: an input and output device switching module connected with the input and output device; and a processing module;

the method further comprising:

the processing module controls the input and output device switching module so that the input and output device is connected to the first computer or the second computer.

Exemplificative, the input and output device switching module is a KVM switching module.

In this example, when the input and output device is connected with the first computer, the input and output device is associated with the input and output device data of the first computer; and when the input and output device is connected with the second computer, the input and output device is associated with the input and output device data of the second computer. For example, when the input and output device comprises a display, the display displays the video signal of the first computer when it is connected with the first computer; and the display displays the video signal input by the second computer when it is connected with the second computer.

Preferably, in the method according to an embodiment of the present invention, when the input and output device is connected with the second computer, it further comprises that:

when the second computer monitors it needs to switch the input and output device to be connected with the first computer, e.g. the second computer receives a command for switching the input and output device to be connected with the first computer, the second computer generates a switching file and stores the switching file to the data interactive module;

when the first computer monitors the switching file, it fetches the switching file from the data interactive module and switches the input and output device to be connected with the first computer according to the switching file.

Exemplificative, in a particular implementation, when the second computer monitors that it needs to switch the input and output device to be connected with the first computer, it generates a system switching command code and generates a switching file by utilizing the system switching command code, e.g. the code is stored in the switching file; when the first computer receives the switching file it obtains the system switching command code and switches the input and output device to be associated with the input and output device data of the first computer according to the predefined correspondence relationship between the system switching command code and the switching operation to be performed.

Preferably, in the method according to an embodiment of the present invention, when the first computer or the second computer monitors that it needs to switch the input and output device such as a KVM device, the KVM device is switched. The command of needing to be switched may be manually sent by the user through software or hardware such as a soft key or a hard key, or it may be automatically switched according to the function to be implemented based on the predefined functions of the respective computers.

Figure 6:
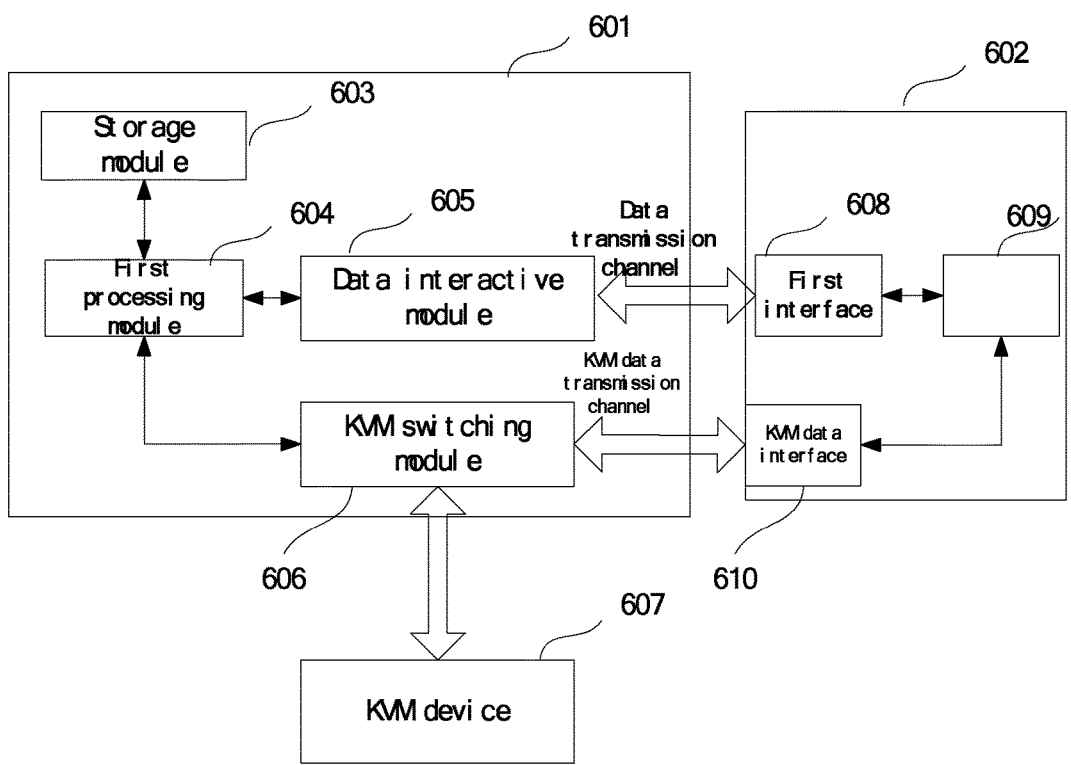
FIG. 6 is a schematic view of the basic principle of the method to realize coupling between computers according to an embodiment of the present invention.

FIG. 6 is a schematic view of the basic principle of the method to realize coupling between computers according to an embodiment of the present invention. As shown in FIG. 6, the first computer 601 and the second computer 602 coupling to each other share a set of KVM device 607 including a display, a keyboard and a mouse. As shown in FIG. 6, the first computer 601 comprises a storage module 603 for storing the user data, a first processing module 604, a data interactive module 605 and a KVM switching module 606; and the second computer 602 comprises a second interface 608, a KVM data interface (a third KVM data interface) 610 and a second processing module 609. The first computer is connected with the second interface of the second computer through the first interface (not shown); the first interface is connected with the data interactive module; the KVM switching module of the first computer is connected with the KVM data interface of the second computer through the first KVM data interface (not shown); the KVM switching module of the first computer is connected with the external input and output device such as a KVM device through the second KVM data interface (not shown), the KVM device including a display, a keyboard and a mouse. In this example, the first computer and the second computer share a set of input and output device and the set of input and output device is connected with the KVM switching module of the first computer.

Exemplificative, the first interface is a first USB interface, the second interface is a second USB interface and the two interfaces are connected through a USB line. When the first computer transmits the first program to the second computer through the first and second USB interface, a data transmission channel is established automatically or mutually between the first computer and the second computer by utilizing the data interactive module and the connecting lines between the first interface and the second interface after the second computer runs the first program, e.g. the second processing runs the first program. The first and second computers implement the data synchronization between the two computers by storing or transmitting the data to be transmitted to eth data interactive module. Various data are interacted by utilizing the data transmission channel. The switching of the user scene between the two computers is implemented by interacting the user scene control file. The second computer may send the switching file for KVM switching to the first computer through the data transmission channel mentioned above. The first computer system may control the KVM switching module by utilizing the switching file so that the input and output device is switched from being connected with the second computer to being connected with the first computer.

A KVM data transmission channel may be formed between the first computer and the second computer by utilizing a connecting line between the first KVM data interface and the third KVM data interface. By utilizing the KVM data transmission channel, the second computer may input its KVM data signals to the first computer. The first computer makes that the KVM device is connected (e.g. electrically connected) with the first computer so that the KVM device inputs and outputs the KVM data of the first computer, or makes that the KVM device is connected with the second computer so that the KVM device inputs and outputs the KVM data of the second computer. Exemplificative, the KVM data transmission channel comprises a video transmission line for transmitting a video signal and a USB line for transmitting data of keyboard and mouse. Exemplificative, the first processing module is a first CPU such as an ARM processor, and the second processing module is a second CPU, such as X86 processor.

It is understood for those skilled in the art that all or a partial of steps of implementing the method may be accomplished by instructing the relevant hardware through a program, the program being stored to a storage medium which is read by a computer, when the program being executed, it comprises the following steps:

when the first computer detects the first interface is connected with the second computer, it establishes a communication connection with the second computer through the data interactive module; and the first computer stores the first data to be transmitted to the second computer to the data interactive module, wherein the second computer accesses the first data through the first interface and performs corresponding actions according to the type of the first data.

For example, the storage medium may be ROM/RAM, magnetic disk, optical disk and so on.

By utilizing the preferred embodiment of the present invention, it has a higher user scene switching rate, higher stability and a strong coupling since the data communication between the two computers are implemented by software and the two computers are coupled to each other through an ordinary data ports.

What is mentioned above is the preferred embodiment of the present invention. It should be pointed out that various modification and improvements may be made by those skilled in the art without departing from the principle of the present invention. The modification and improvements may also be considered as falling into the scope of the present invention.

What is claimed is:

1. A computer comprising:
   at least one processor;
   a first interface executable by the at least one processor to connect with a second computer directly;
   a built-in data interactive module executable by the at least one processor and connected with the second computer through the first interface to enable the second computer to access the data interactive module when the first interface is connected with the second computer directly, wherein the access includes fetching data from the data interactive module and storing data into the data interactive module; and
   a processing module executable by the at least one processor and connected with the data interactive module to communicate data with the second computer through the data interactive module when the first interface is connected with the second computer directly, the processing module further comprising a data fetching module executable by the at least one processor to monitor a change of data in the data interactive module when the first interface is connected with the second computer directly and configured to fetch second data stored to the data interactive module by the second computer from the data interactive module;
   wherein the second data fetched by the data fetching module from the data interactive module comprises a second control file generated by the second computer according to a collected second user scene, the collected second user scene comprising at least one of programs executing on the second computer and files open on the second computer; and
   wherein the processing module further comprises a scene switching module executable by the at least one processor for switching current user scene information to the second user scene, the current user scene information comprising at least one of the application programs executing on the second computer and the files open on the second computer; and
   wherein the processing module further comprises a control file generating module executable by the at least one processor to collect information of a current first user scene, to generate a first control file, and to store the first control file into the data interactive module, the first control file being configured for the second computer to recover the first user scene in the second computer locally.

2. The computer according to claim 1 wherein the first interface is a USB interface, the data interactive module is a USB data interactive module capable of implementing USB data transmission, and the computer and the second computer are connected with each other through a USB signal transmission line.

3. The computer according to claim 1, wherein:
the second data fetched by the data fetching module from the data interactive module comprises a third control file for the second computer controlling the computer including the data interactive module to enter a predefined state; and
the processing module further comprises a state switching module executable by the at least one processor for switching a state of the computer to the predefined state according to the third control file.

4. The computer according to claim 1, further comprising:
a first input and output device interface connected with an input and output device; a second input and output device interface for receiving an input and output device data input by the second computer; and
an input and output device switching module connected with the input and output device through the first input and output device interface; wherein the processing module further comprises a switching processing module for controlling the input and output device switching module to associate the input and output device with a first input and output device data of the computer or to associate the input and output device with a second input and output device data input by the second computer.

5. A method to realize coupling between a first computer and a second computer, wherein the first computer comprises a first interface for connecting with the second computer directly; a built-in data interactive module connected with the second computer through the first interface for enabling the second computer to access the data interactive module when the first interface is connected with the second computer directly, the access comprising fetching data from the data interactive module and storing the data to the data interactive module, the method comprising the following steps:
when the first computer detects the first interface is connected with the second computer, the first computer establishes a communication connection with the second computer through the data interactive module;
the first computer stores first data to be sent to the second computer to the data interactive module, in which the second computer accesses the first data through the first interface and performs corresponding actions according to a type of the first data;
wherein after the first computer establishes the communication connection with the second computer:
the second computer stores second data to be sent to the first computer to the data interactive module, wherein the second computer storing the second data into the data interactive module comprises: the second computer collects information of a current second user scene and generates a second control file, the current second user scene comprising at least one of programs executing on the second computer and files open on the second computer; and the second computer sends the second control file to the data interactive module; and
when the first computer determines that the second data is in the data interactive module, the first computer fetches the second data from the data interactive module, wherein the first computer fetching the second data from the data interactive module comprises: the first computer fetches the second control file from the data interactive module; and
the first computer recovers the second user scene in the first computer according to the second control file, the recovering of the second user scene comprising at least one of executing, on the first computer, the application programs executing on the second computer and opening, on the first computer, the files open on the second computer; and
wherein the step of the first computer storing the first data to be sent to the second computer into the data interactive module comprises: the first computer collects information of a current first user scene and generates a first control file; and the first computer stores the first control file into the data interactive module; and
wherein after the first control file is stored into the data interactive module, the method further comprises:
when the second computer monitors the first control file, the second computer fetches the first control file from the data interactive module; and
the second computer recovers the first user scene in the second computer according to the first control file.

6. The method according to claim 5,
wherein the step of the second computer storing the second data to the data interactive module comprises:
the second computer storing a second control file for controlling the first computer to enter a predefined state to the data interactive module; and
wherein the step of the first computer fetching the second data from the data interactive module comprises:
the first computer fetches the second control file from the data interactive module and switches the state to the predefined state according to the second control file.

7. The method according to claim 5, wherein the first computer and the second computer share an input and output device, and the input and output device is not connected to both of the first computer and the second computer at the same time, wherein the first computer comprises an input and output device switching module connected with the input and output device and a processing module, the method further comprising:
the processing module controls the input and output device switching module so that the
input and output device is connected to the first computer or the second computer.

8. The method according to claim 7, wherein when the input and output device is connected with the second computer, the method further comprises:
when the second computer determines a need to switch the input and output device to be connected with the first computer, the second computer generates a switching file and stores the switching file into the data interactive module; and
when the first computer monitors the switching file, the first computer fetches the switching file from the data interactive module and switches the input and output device to be connected with the first computer according to the switching file.

* * * * *